United States Patent [19]

Gnyra

[11] Patent Number: 4,632,292
[45] Date of Patent: Dec. 30, 1986

[54] METHOD OF JOINING PIPES BY EXPLOSIVE WELDING USING DISINTEGRATING ANVIL

[75] Inventor: Bohdan Gnyra, Kingston, Canada

[73] Assignee: Alcan International Limited, Montreal, Canada

[21] Appl. No.: 622,538

[22] Filed: Jun. 20, 1984

Related U.S. Application Data

[63] Continuation of Ser. No. 376,007, May 7, 1982, abandoned.

[30] Foreign Application Priority Data

May 11, 1981 [CA] Canada .................................... 377288

[51] Int. Cl.$^4$ ............................................ B23K 20/08
[52] U.S. Cl. ..................................... 228/107; 228/2.5
[58] Field of Search ................. 228/50, 107, 108, 109, 228/2.5

[56] References Cited

U.S. PATENT DOCUMENTS 4,062,570  12/1977  Wilson .................................. 285/22
4,228,941  10/1980  Persson ................................. 228/107

FOREIGN PATENT DOCUMENTS 0051942  5/1975  European Pat. Off. ............ 228/109
858517  1/1961  United Kingdom ................... 228/50

*Primary Examiner*—Nicholas P. Godici
*Assistant Examiner*—Kurt Rowan
*Attorney, Agent, or Firm*—Cooper, Dunham, Griffin & Moran

[57] ABSTRACT

A method is described for joining an inner metal pipe with an outer surrounding metal tubular portion by means of explosive welding in which a contact anvil is placed inside the inner pipe to support it during welding. With the anvil in place, the pipes are subjected to explosive welding such that the outer surface of the inner pipe is joined metallurgically to the inner surface of the outer tubular portion. According to the novel feature, the anvil is made from hydrated aluminum sulphate, preferably a water soluble commercial alum, which not only disintegrates during welding but is also water soluble.

10 Claims, 3 Drawing Figures

METHOD OF JOINING PIPES BY EXPLOSIVE WELDING USING DISINTEGRATING ANVIL

This is a continuation of application Ser. No. 376,007, filed May 7, 1982, abandoned.

BACKGROUND OF THE INVENTION

1. Field of the Invention

This invention relates to the joining of pipes by means of explosive welding, and particularly to a method of explosive welding in which a disintegrating anvil is used.

2. Summary of the Prior Art

It has been known for many years to join lengths of pipe by means of explosive welding. This technique has been found to be particularly useful in joining large and long pipes such as are used for commercial pipe lines. Three basic welding systems are used, these being:

(i) systems in which two coaxial tubes constrained on the outside by a die are welded when an explosives charge is detonated in the bore of the inner cylinder;

(ii) systems in which two coaxial cylinders, supported from the inside by a rigid plug, are welded when an explosive charge is detonated on the outside surface of the outer tube; and (iii) systems in which two coaxial cylinders are welded when two explosive charges, placed respectively inside and outside the cylinder assembly, are detonated.

As indicated above, the second system requires the use of a rigid plug which acts as a contact anvil or mandrel inside the inner pipe to provide a reaction to the force generated by the explosion to prevent collapse of the inner pipe during welding. This anvil can be in the form of a solid plug which is subsequently removed, or it may be in tubular form and remain inside the tube as a permanent mandrel. The solid plugs were typically made of a low melting point metal, such as lead, which could be melted out after the welding was completed. However, melted lead is not an easy material to handle, particularly when extremely long lengths of pipe are being joined. The permanent mandrel has the disadvantage of producing a restriction in the inside of the pipe. This is tolerable for gas transmission and distribution lines but is not tolerable for pipelines which carry a variety of products, both liquid and gas, because the permanent mandrel would interfere with the "pigging" operation used to clean the pipelines.

There has, therefore, been a need in the field for an improved form of removable anvil or mandrel. 15 An attempt at producing such an improved form of anvil is described in U.S. Pat. No. 4,228,941, issued Oct. 21, 1980. In that case, the anvil was made from a salt which is soluble in water. This salt anvil could be removed by dissolving in water after the explosive welding was completed. Although the U.S. patent describes what is basically a good idea, the only example given of a suitable salt for the purpose was a salt mixture of sodium nitrite, sodium nitrate and potassium nitrate. The inventor suggested that the salt anvil can be enclosed in a protective cover which is not permeable, or can be provided with a protective layer which is not permeable. He further suggested using a plastic for the cover and a latex or varnish for the protective layer. He particularly specified that the cover or layer must not be soluble in water.

The present inventor has found that the salt mixture used in the U.S. patent is highly hygroscopic and must be protected from moisture during storage and use. The most serious disadvantage of the insoluble protective coating or cover, necessary because of the hygroscopicity, is that the anvil is no longer completely soluble, leaving portions of the insoluble coating within the pipeline after the anvil is dissolved following explosive welding.

It is, therefore, the object of the present invention to provide a salt capable of producing an anvil which has the necessary strength characteristics to be used in explosive welding and being fully soluble in water, while avoiding the disadvantage of being highly hygroscopic.

SUMMARY OF THE INVENTION

In accordance with the present invention it has been found that a highly suitable material for a disintegrating anvil is a hydrated aluminum sulphate. It is particularly suitable in the form of commercial ground alum.

Thus, the present invention in its broadest aspect relates to a method of joining an inner metal pipe with an outer surrounding metal tubular portion by means of explosive welding in which a contact anvil is placed inside the inner pipe to support it during welding and then the pipe and tubular portion are subjected to explosive welding such that the outer surface of the inner pipe portion is joined metallurgically with the inner surface of the outer tubular portion. The novel feature comprises the use of a hydrated aluminum sulphate as the principal ingredient of the anvil.

The outer surrounding tubular portion may conveniently be in the form of an outwardly flared end of a pipe to be joined or it may be a tubular sleeve with outwardly flared portions which fits over the ends of two pipes to be joined.

Preferably, the material used is any commercially available aluminum sulphate which will produce as a final product $Al_2(SO_4)_3 \cdot xH_2O$, where the "x" value will yield between 50% and 55% $H_2O$ of crystallization. It has been found that below about 50%, the anvil tends to crack during manufacture and above about 55% the anvil does not have sufficient strength or hardness. A particularly preferred range is between about 52% and 54% $H_2O$ of crystallization (combined). This is about halfway between $Al_2(SO_4)_3 \cdot 18H_2O$ and $Al_2(SO_4)_3 \cdot 24H_2O$.

As an alternative to starting with aluminum sulphate, it is also possible to react either alumina trihydrate with sulphuric acid or bauxite (containing e.g. 40–50% $Al_2O_3$, 5–15% $Fe_2O_3$, 3–5% $SiO_2$) with a spent sulphuric acid (e.g. pickling acid), along with water.

It has been found that the strength characteristics of the anvil in accordance with this invention are such that the anvil can be formed either as a solid plug or as an annular insert. The annular insert has the advantage of disintegrating into smaller pieces during explosive welding, thereby being easier to dissolve and remove from the pipeline.

It has also been found that a considerable amount of insoluble materials can be present in the anvil together with the aluminum sulphate without serious interference with the ease of removal of the anvil. For instance, up to 50% by weight of insoluble impurities or additives can be included. Examples of such solid fillers can include alumina trihydrate powder, anhydrite (calcium sulphate), silica sand, etc. These solid fillers, although being insoluble, do not seem to interfere with the disintegration of the anvils and the relatively small particles of fillers which remain after the alum has been dissolved are washed out of the pipeline with the flushing water.

It is, furthermore, possible to include a small amount, e.g. up to 10% by weight, of additional soluble salts in the anvil without hurting its characteristics. For example, good results have been obtained with anvils containing, in addition to the aluminum sulphate, 5% by weight of sodium sulphate (i.e. 5% $Na_2SO_4$ based on the weight of $Al_2(SO_4)_3$ present) or 10% by weight total of equal parts of sodium sulphate and magnesium sulphate.

Further features and advantages of the invention will be apparent from the detailed description hereinbelow set forth, together with the accompanying drawings.

DETAILED DESCRIPTION

Figure 1:
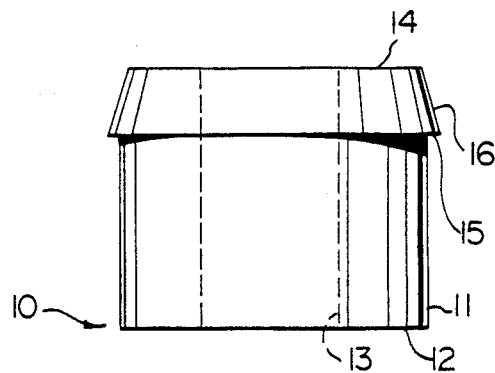
FIG. 1 is a side elevation of a preferred form of anvil according to the invention.

As will be seen in FIG. 1, the anvil 10 includes a main cylindrical body portion 11 with an end 12 and a central hole 13 extending through the entire length of the anvil. At the end of the cylindrical portion remote from end 12 is a projecting annular shoulder 15 which forms an abutment for the end of a pipe. Between shoulder 15 and end 14 is a frusto-conical face 16.

Figure 2:
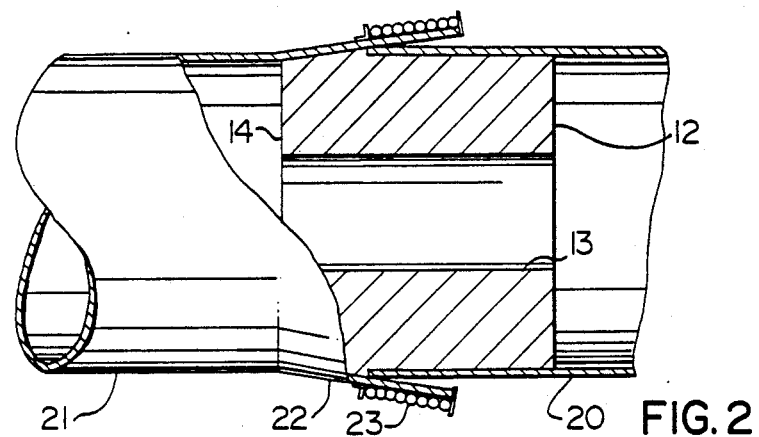
FIG. 2 is a sectional view in elevation of the anvil in position in pipes to be joined by explosive welding.

The manner in which the anvil 10 is used can best be seen from FIG. 2 with the cylindrical portion 11 fitted within pipe 20 with the end of the pipe abutting the shoulder 15. The second pipe 21 has an outwardly flared end 22 which corresponds in slope to the slope of the frusto-conical face 16 and projects beyond the end of pipe 20 to provide an overlapped section. This overlapped section is wound with an explosive material 23, such as primacord.

The angle of taper of the flared section 22 and the frusto-conical face 16 is typically about 4° to 8°, with an angle of about 7° being common. The primacord used is typically a 30–40 grain primacord placed in a charge positioning sleeve and wrapped with suitable buffer tape.

Detonation of the primacord produced a complete welding of the pipe sections and a gas-tight joint. On detonation, the anvil fractured into small pieces which were easily dissolved and washed out of the pipeline. The anvil was found to support the inner pipe equally well whether made in annular form as shown in the drawings or made in the form of a solid plug.

Figure 3:
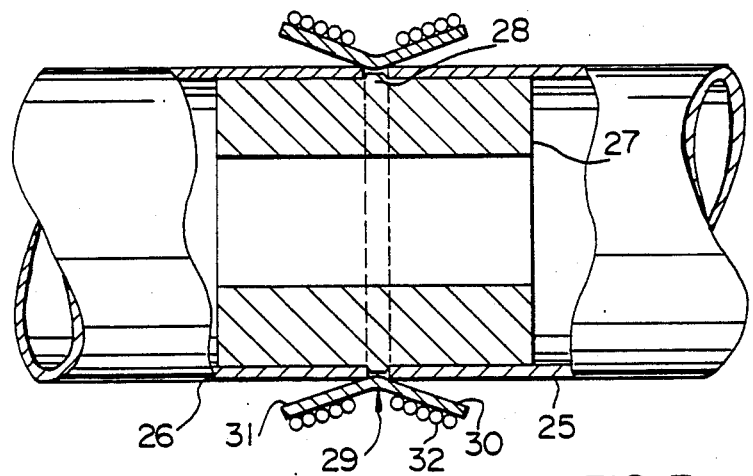
FIG. 3 is a sectional view in elevation of a further embodiment of the invention.

Another embodiment of the invention is shown in FIG. 3 in which the ends of the pipe being joined are not deformed in any manner. Thus, the ends of pipes 25 and 26 are arranged in an end-to-end relationship with a small space therebetween and an annular anvil 27 mounted within the ends of the pipes. This anvil includes a peripheral projection 28 serving as a spacer for the ends of the two pipes being joined.

In this embodiment the joining member is a tubular sleeve 29 which is bent into a shallow V cross section as shown such as to provide two flared sections 30 and 31. These flared sections 30 and 31 are wrapped with an explosive material 32, such as primacord. When the explosive material is detonated, the flared sections 30 and 31 are driven down into metallurgical bond with the tubes 25 and 26, forming gas-tight joints.

Production of Anvils

The material used was a ground or powdered alum, $Al_2(SO_4)_3.16-17H_2O$ having a bulk density of 1.56. About 15.5 parts by weight of the powdered or ground alum and about 1.5 parts by weight of water were placed in a melting kettle and heated for one to two hours until all of the solid melted at 112° C. The melt was brought to a foaming boil for about five minutes and then removed from heat and allowed to de-aerate, after which the melt was poured into multiple molds to form the anvils. The anvils were ready for removal from the molds within about an hour after casting and were ready for firing the following day.

In making anvils by reacting alumina trihydrate or bauxite with sulphuric acid, one can use (a) 32 parts of $H_2SO_4$ (conc.) mixed with 25 parts of water to which is added 16 parts of alumina trihydrate, or (b) 32 parts of $H_2SO_4$ (conc.) mixed with 25 parts of water to which is added 22 parts of ground bauxite. In both cases, the mixture is boiled for one to two hours before casting into the molds for anvils.

It is to be understood that the invention is not limited to the features and embodiments hereinabove specifically set forth but may be carried out in other ways without departure from its spirit.

I claim:

1. A method of joining an inner metal pipe with an outer surrounding metal tubular portion by means of explosive welding which comprises placing a contact anvil inside the inner pipe to support the said inner pipe during welding and then subjecting the pipe and tubular portion to explosion welding such that the surface of the inner pipe is joined metallurgically with the inner surface of the outer tubular portion, characterized in that the anvil consists essentially of a hydrated aluminum sulphate which contains about 50% to about 55% water of crystallization.

2. A method according to claim 1, characterized in that the anvil is molded from a hydrated aluminum sulphate obtained from commercial ground alum.

3. A method according to claim 1, characterized in that the anvil is annular.

4. A method according to claim 1, 2 or 3, characterized in that the metal pipe and metal tubular portion are made of aluminum.

5. A method according to claim 1, 2, or 3, characterized in that the anvil fractures during explosive welding and is removed from the pipes after welding by being dissolved in water.

6. A method according to claim 1, characterized in that said outer surrounding metal tubular portion is a pipe provided with an outwardly flared end and a portion of said outwardly flared portion surrounds an end portion of said inner pipe.

7. A method according to claim 6, characterized in that the anvil is formed with a cylindrical outer face terminating at one end in an outwardly projecting portion, with an annular shoulder between said cylindrical face and the face of said projection, and said projection face being tapered inwardly away from said shoulder at a slope corresponding to the taper of said flared portion.

8. A method according to claim 7, wherein said anvil is positioned with the cylindrical portion thereof inside said inner pipe and the tapered projection thereof mating with an inner portion of said outwardly flared portion.

9. A method according to claim 1, 2 or 3, characterized in that the outer tubular portion is a tubular sleeve with outwardly flared portions fitted over the ends of two pipes to be joined.

10. A method according to claim 1, 2 or 3, wherein the anvil also contains up to 10% by weight of an additional soluble salt.

* * * * *